United States Patent
Endou et al.

(10) Patent No.: US 7,322,752 B2
(45) Date of Patent: Jan. 29, 2008

(54) OPTICAL DEVICE MODULE, OPTICAL TRANSMITTER AND RECEIVER, AND OPTICAL RECEPTACLE

(75) Inventors: Futoshi Endou, Yokohama (JP); Naofumi Morohashi, Yokohama (JP); Atsushi Miura, Yokohama (JP)

(73) Assignee: Opnext Japan, Inc., Yokohama-shi (JP)

( * ) Notice: Subject to any disclaimer, the term of this patent is extended or adjusted under 35 U.S.C. 154(b) by 0 days.

(21) Appl. No.: 11/220,608

(22) Filed: Sep. 8, 2005

(65) Prior Publication Data
US 2006/0078261 A1    Apr. 13, 2006

(30) Foreign Application Priority Data
Sep. 10, 2004   (JP)   .............. 2004-263189
Jun. 24, 2005   (JP)   .............. 2005-184250

(51) Int. Cl.
  *G02B 6/36*   (2006.01)
(52) U.S. Cl. .............. 385/92; 385/88; 385/93; 385/94
(58) Field of Classification Search .......... 385/92
  See application file for complete search history.

(56) References Cited

U.S. PATENT DOCUMENTS

| 5,537,503 | A | * | 7/1996 | Tojo et al. | ............ 385/93 |
| 2001/0024551 | A1 | * | 9/2001 | Yonemura et al. | ............ 385/88 |
| 2004/0146252 | A1 | * | 7/2004 | Healy et al. | ............ 385/88 |
| 2005/0013552 | A1 | * | 1/2005 | Chien | ............ 385/88 |

FOREIGN PATENT DOCUMENTS

| JP | 05-249344 |   | 9/1993 |
| JP | 2001-066468 | * | 3/2001 |

* cited by examiner

*Primary Examiner*—Frank G. Font
*Assistant Examiner*—Ryan Lepisto
(74) *Attorney, Agent, or Firm*—Mattingly, Stanger, Malyur & Brundidge, P.C.

(57) ABSTRACT

An optical device module includes a stub ferrule for guiding a laser light to an optical fiber to be connected, a sleeve for holding an optical-connector ferrule of the optical fiber to be connected and the stub ferrule, a holder for fixing the stub ferrule and the sleeve, and an adapter for connecting the holder and an optical module, in which the sleeve is formed by a nonmetallic material, reducing the structure of metal portion and restraining the antenna effect when electromagnetic noise enters.

2 Claims, 5 Drawing Sheets

OPTICAL DEVICE MODULE, OPTICAL TRANSMITTER AND RECEIVER, AND OPTICAL RECEPTACLE

INCORPORATION BY REFERENCE

The present application claims priorities from Japanese applications JP 2005-184250 filed on Jun. 24, 2005, JP 2004-263189 filed on Sep. 10, 2004, the contents of which are hereby incorporated by reference into this application.

BACKGROUND OF THE INVENTION

The present invention relates to an optical device module used in an optical receptacle type optical transceiver, such as a light-emitting device module or a light-receiving device module, and also to an optical transceiver of light receptacle structure in which the above-mentioned optical device module is mounted.

With the increase in the amount of transmission in recent years due to the diffusion of the Internet, for example, optical transceivers have come to be used as articles of everyday use. As for the mode of using optical transceivers in this case, it is most effective to use optical receptacle type optical transceivers, which can be directly detached and connected to the panel of a router or a switch, for example, to which the optical connector can be directly connected. In other words, the optical transceivers of this type are superior in maintainability and expandability. Moreover, there is strong requirement that optical transceivers should provide characteristics as general-purpose devices, which include better EMC characteristics and desirable optical connection characteristics in handling the optical connector.

FIG. 4 shows the structure of a light-emitting device module or light-receiving device module for a conventional optical receptacle. A stub ferrule 403 is contacted to an optical-connector ferrule by the spring force of the optical connector part in the receptacle, not shown, and guides a laser beam into an optical fiber. As the leading end portion of the stub ferrule 403 is aligned to the optical-connector ferrule by a sleeve 402, light is coupled into a single mode fiber about 10 µm in diameter.

After the stub ferrule 403 is press-fit into a metal-made holder 404 and a sleeve 402 is mounted, a metal-made sleeve cover 401 is fixed by being press-fit to the metal-made holder 404 from the outside. The parts 401, 402, 403 and 404, which have been put together and which have been centered with respect to a light-emitting device or a light-receiving device 406, are connected together by YAG welding.

In order that the stub ferrule 403 and the sleeve 402 can attain a high connection characteristic of an optical connector which requires a µm-level accuracy, they are often made of a ceramic superior in hardness and machining accuracy. In addition a reference numeral 407 denotes a lens, and 409 denotes a stem.

In the structure of a light-emitting device module or light-receiving device module for a conventional optical receptacle, in an optical transceiver which adopts this kind of module, problems described below are likely to occur.

(1) In a light-emitting device module or a light-receiving device module, a light-emitting device or a light-receiving element 408 which operates at high speed is mounted, and the light-emitting device is driven by a modulated relatively large current (several tens of mA, for example) and the light-receiving device deals with a minute modulated current signal (several tens of µA, for example) obtained as a result of photoelectric conversion. If the sleeve cover 401 at the leading end portion of the light-emitting device module or the light-receiving element is made of metal, this metal portion may act as a radiating antenna or receiving antenna. As a result, EMI and EMS characteristics deteriorate.

(2) When a statically charged person touches an optical connector connected to an optical transceiver, if the sleeve cover 401 at the leading end portion of the light-emitting device module or light-receiving device module is a metal piece, the static electricity released from the human body conducts through a metal spring in the optical connector and the optical ferrule metal-made retainer and is discharged to the metal sleeve cover 401 at the leading end portion of the light-emitting device module or the light-receiving device module which comes close to the optical connector when optical connector is connected. This discharged static electricity flows through the metal-made holder 404 and the metal-made adapter 405, causing a malfunction to occur in an internal circuit, including the light-emitting device or the light-receiving element 408.

To improve those problems, in a technology disclosed in JP-A-2001-66468, a method of using a resin material for the sleeve cover is adopted. However, because the resin material is inferior in hardness than a metal material, when a stress, which corresponds to a transversal tensile force to the optical fiber, is applied to the optical connector under the condition that the optical connector is connected to an optical receptacle type optical transceiver, that resin portion itself is deformed by the stress, thus increasing the optical connection loss.

In recent years, besides maintenance personnel skilled in this special field, an increasing number of general users handle optical fibers, and there has been higher demand for optical connection characteristics and resistance characteristics in handling optical fibers, which is undesirable.

In the case where the sleeve or the sleeve holder is made of a resin, when the optical connector is disconnected or connected, it sometimes occurs that the optical-connector ferrule, which is generally made of a hard substance, at the end of the optical connector contacts the resin sleeve or sleeve holder and scrapes the surface, with the result that scraping chips of the resin material are produced. The scraping chips enter between the contact surfaces of the optical-connector ferrule and the stub ferrule of the light-emitting device module or light-receiving device module, involved in coupling of light, giving rise to an increase in optical connection loss at the contact surfaces and deteriorations in optical connection characteristics, such as an increase in reflected light.

Furthermore, in the connection between an optical fiber cable and an optical transceiver or an optical transmitter or an optical receiver, light is coupled by contact between an optical connector on the optical fiber cable side and an optical receptacle with which the optical connector is connected on the optical transmitter/receiver side.

The structure of a conventional optical receptacle is such that the stub ferrule is split and enclosed by a sleeve and those parts are fixed with two parts, a sleeve cover and a holder, by YAG welding, and the stub ferrule is engaged with the ferrule of the optical connector. The stub ferrule and the split sleeve are made of ceramic and the sleeve cover and the holder are made of steel.

In the above-mentioned structure, however, problems will arise as follows: (1) Because a large proportion of the structure is accounted for by metal parts, the optical transmitter or receiver tends to work as a radiation transmission antenna or a reception antenna and, as a result, the EMC characteristics deteriorate, and (2) Because a metal and a ceramic are used at the leading end portion of the receptacle where the connector is connected, on account of electrical noise entering from the connector side, the characteristics of the other component parts deteriorate.

On the other hand, in a technology disclosed in JP-A-5-249344, an attempt is made to improve static electricity discharge resistance by forming the receptacle main body by a high insulation material, but no consideration is given to means for solving the problem of electrostatic discharge through the optical connector, nor is any concrete method disclosed for use with a light-emitting device module or light-receiving device module for a receptacle as opposed to the present invention.

SUMMARY OF THE INVENTION

The present invention has as its object to provide an optical receptacle structure excellent in the EMI and EMS characteristics and superior in the optical connection characteristics under a transversal tensile stress to the optical fiber when connecting the optical connector, and higher in economic advantages and improved in ease of assembly.

A ceramic material is used to form the leading end portion of the light-emitting device module or light-receiving device module, which is a part of the optical receptacle structure.

By using a ceramic material for the leading end portion where the connector of the optical receptacle is connected, a high level of insulating property can be maintained, making it possible to increase the resistance to external electrical noise, such as electrostatic discharge. Because the proportion of metal component parts is reduced, it is possible to minimize the radiation of noise generated in the light-emitting device module or light-receiving device module. Because a ceramic material has high hardness and good machinability with high accuracy, it is possible to minimize deterioration in the optical connection characteristics under a transversal tensile stress to the optical fiber when connecting the optical connector.

Other objects, features and advantages of the invention will become apparent from the following description of the embodiments of the invention taken in conjunction with the accompanying drawings.

DETAILED DESCRIPTION OF THE EMBODIMENTS

Figure 1:
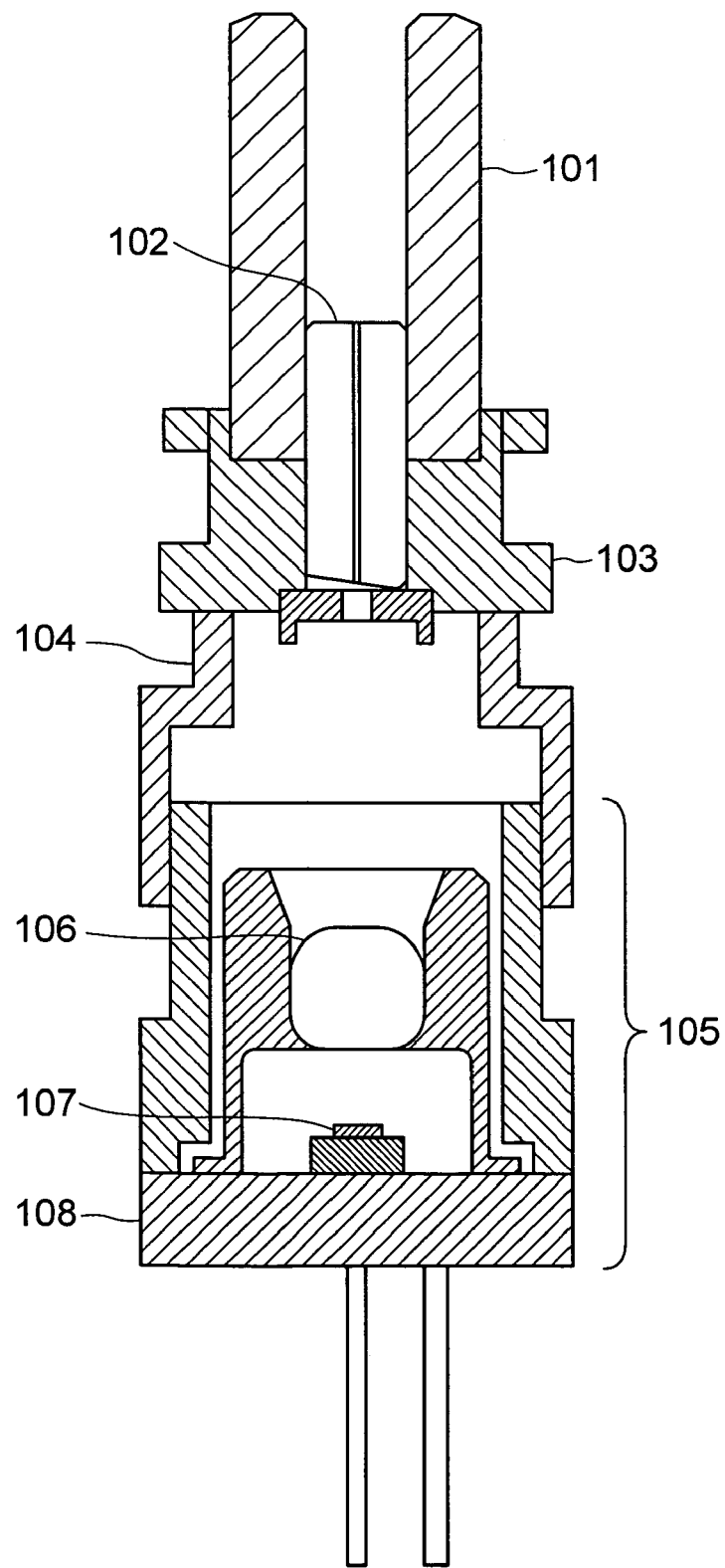
FIG. 1 is a diagram showing a first embodiment of the present invention.

As shown in FIG. 1, a nonmetallic sleeve 101 as a single unified body of a sleeve and a sleeve cover is fixed to the stub ferrule 102 and the holder 103. The holder is fixed to the light-emitting device module or light-receiving device module directly or through the intermediary of some other part.

Embodiment 1

FIG. 1 is a diagram showing a first embodiment of the present invention. Incidentally, the basic function of each portion is the same as the corresponding portion in the related art shown in FIG. 4 unless otherwise described. The nonmetallic sleeve 101 holds the optical-connector ferrule and the stub ferrule 102 to be connected, and is in a unified structure of the sleeve cover 401 and the sleeve 402 in FIG. 4 described above. The sleeve 101 connects two cores about 10 µm in diameter, which serve as waveguides located along the central axes of the optical-connector ferrule and the stub ferrule 102, with accuracy of the external dimensions of the two ferrules. On the other hand, with regard to the accuracy of the internal diameter of the ferrules, machining work with µm-level accuracy is required. The stub ferrule 102 and the holder 103 are press-fit and fixed in such a way as to obtain stable positional accuracy.

The nonmetallic sleeve 101 is fixed to the holder 103 with an adhesive. As a material for the nonmetallic sleeve, a Zirconia ceramic material is used. With Zirconia often used for the stub ferrule, it is possible to secure µm-level accuracy when it is ground into a desired shape. It is difficult to realize machining with such accuracy when a resin material is used. To secure firm fixation while maintaining specified accuracy, the holder 103 is joined to the adapter 104 by YAG welding and the adapter 104 is further joined to the light-emitting module or light-receiving module 105 by YAG welding. In addition, a reference numeral 106 denotes a lens; 107, a light-emitting element or light-receiving element; and 108 a stem.

According to this embodiment, the sleeve portion 101 is made of a ceramic and the holder portion and the adapter portion are made of a metal. Under the condition that the light-emitting device module or light-receiving device module is mounted in the housing of an optical transceiver, the metal portions of the holder 103 and the adapter 104 are fixed to the metal housing by using an insulation retaining material in the metal housing.

In a light-emitting device module or light-receiving device module operating at high speed of 10 Gbits/s, for example, the holder 103 and the adapter 104 are often reduced to a circuit ground potential to realize high-frequency characteristics. Even in this case, it is possible to separate the circuit ground potential necessary for a receptacle type optical transceiver from the potential of the metal housing. Moreover, the sleeve 101 is a unified body of the sleeve and the sleeve cover, which helps reduce the number of parts and decrease production cost.

Embodiment 2

Figure 2:
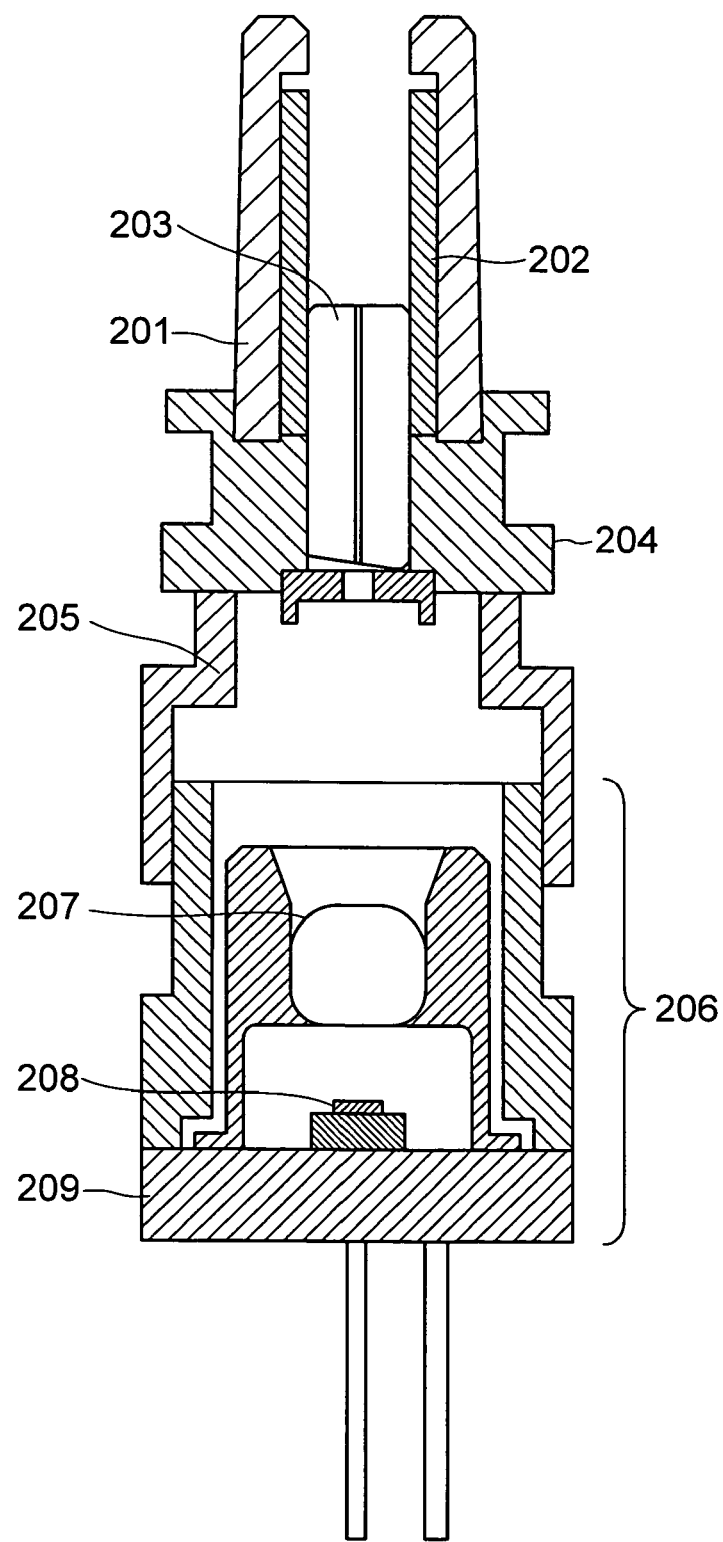
FIG. 2 is a diagram showing a second embodiment of the present invention.

FIG. 2 is a diagram showing a second embodiment of the present invention. As shown in FIG. 2, a stub ferrule 203 is press-fit and fixed to the holder 204 to realize stable positional accuracy. Note that in this embodiment, the sleeve 202 may be a slot sleeve or a precision sleeve without an ordinary slot structure.

In this embodiment, a sleeve cover 201 is press-fit and fixed to the holder to protect the sleeve 202. The holder 204 is joined to the adapter 205 by YAG welding, and the adapter 205 is further joined to further joined to the light-emitting device or light-receiving device 206 by YAG welding.

Incidentally, the sleeve 202, the sleeve cover 201, and the stub ferrule 203 are made of a ceramic, and the holder 204 and the adapter 205 are made of a metal. In other words, the structure in FIG. 2 is similar to the structure shown in FIG.

4, except that a ceramic sleeve cover 201 is used in place of the metal sleeve cover 401. In addition, a reference numeral 207 denotes a lens; 208, a light-emitting element or light-receiving element; 209, a stem.

Figure 4:
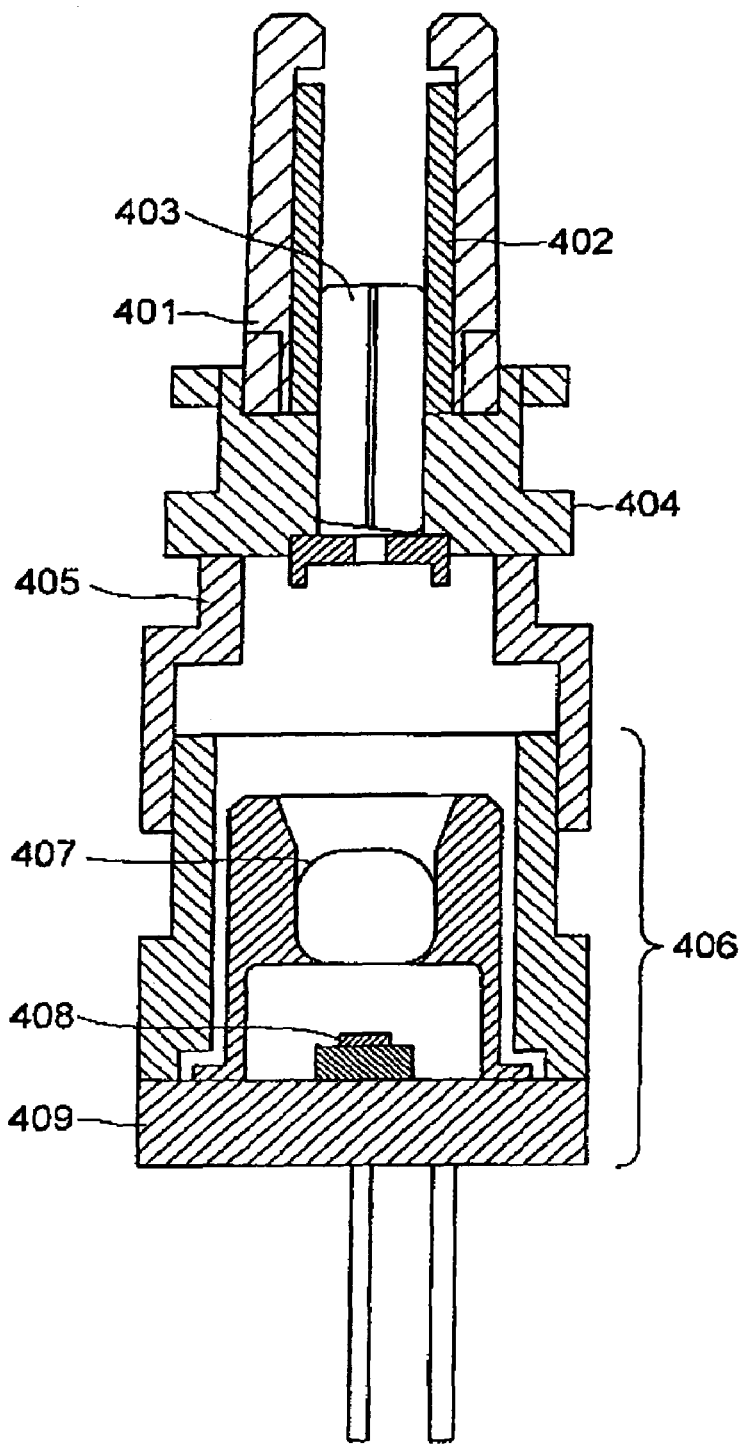
FIG. 4 is a diagram showing related art.

In this embodiment, Zirconia, a ceramic, is used for the sleeve cover 201 which corresponds to the metal sleeve cover 401 in FIG. 4. The thermal expansion coefficient of the sleeve cover 201 is 10.4 ppm/K. An SUS steel with a thermal expansion coefficient α=10.4 ppm/K is used for the metal-made holder 204. By selecting materials with relatively close thermal expansion coefficients for the parts involved in the press-fitting process, it is possible to meet mechanical connection strength requirements of the press-fit parts and also prevent temperature-stress-induced destruction of the Zirconia ceramic parts over the entire temperature range from low temperatures to high temperatures.

According to this embodiment, the sleeve cover 201 is made of a ceramic, and the holder 204 and the adapter 205 are made of metal. Under the condition that a light-emitting device module or light-receiving device module is mounted in the housing of an optical transceiver, the metal-made holder 204 and the metal-made adapter 205 are held by using an insulation retaining material in the metal-made housing.

In a light-emitting device module or light-receiving device module which operates at high speed of 10 Gbits/s, for example, the holder 204 and the adapter 205 are often reduced to a circuit ground potential to realize specified high-frequency characteristics. Also in this case, it is possible to separate the circuit ground potential necessary for the receptacle type optical transceiver from the potential of the metal housing.

The sleeve cover 201 is press-fit and fixed to the holder 204, which is considered more advantageous in terms of connection strength of the fixture portion of the holder 204 than in a case where the sleeve 101 is connected by an adhesive in the first embodiment and also in terms of suppressing the irregularity in the fixing strength caused by an uneven coating amount of adhesive.

Embodiment 3

Figure 3A:
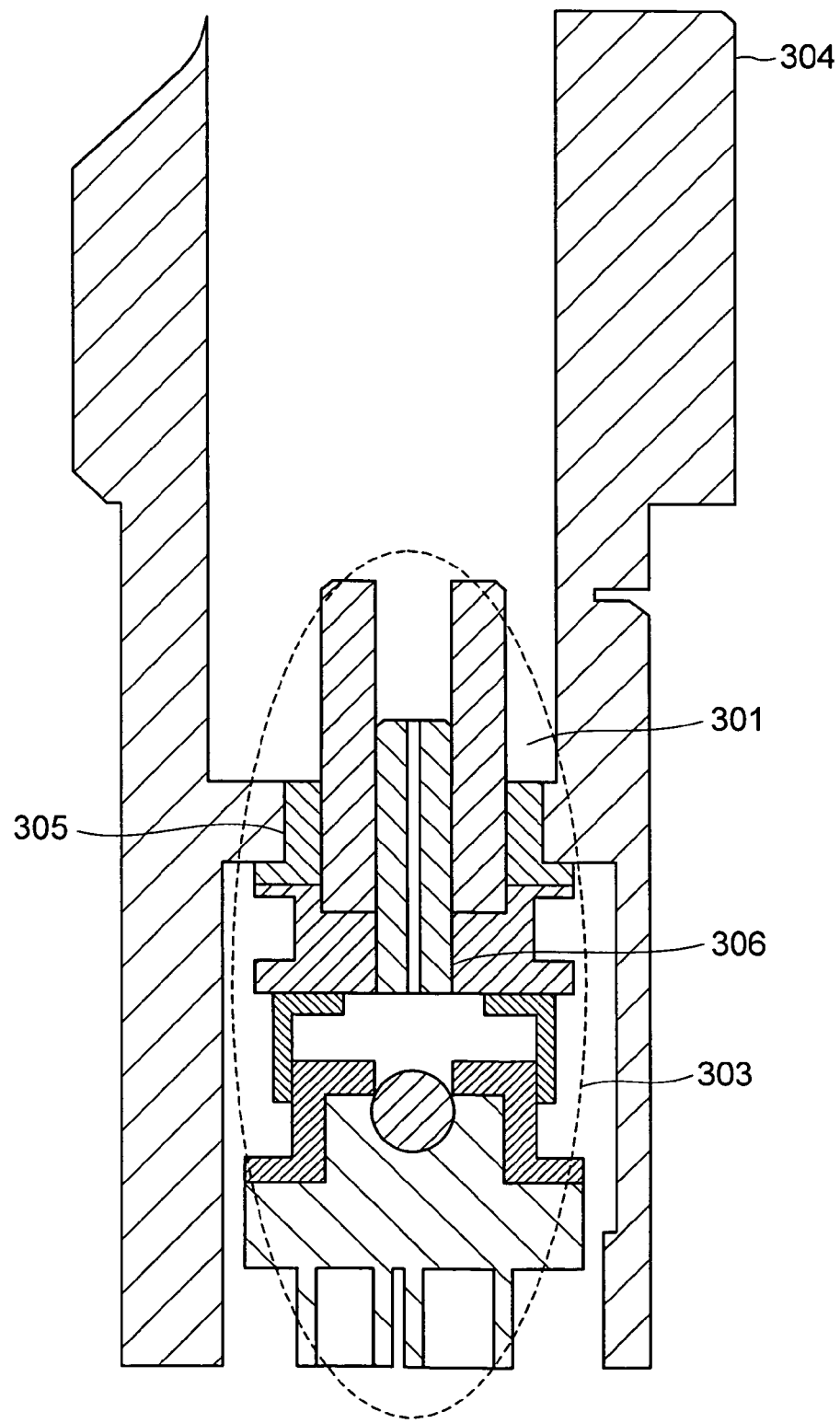
FIG. 3A is a diagram showing a third embodiment of the present invention.
Figure 3B:
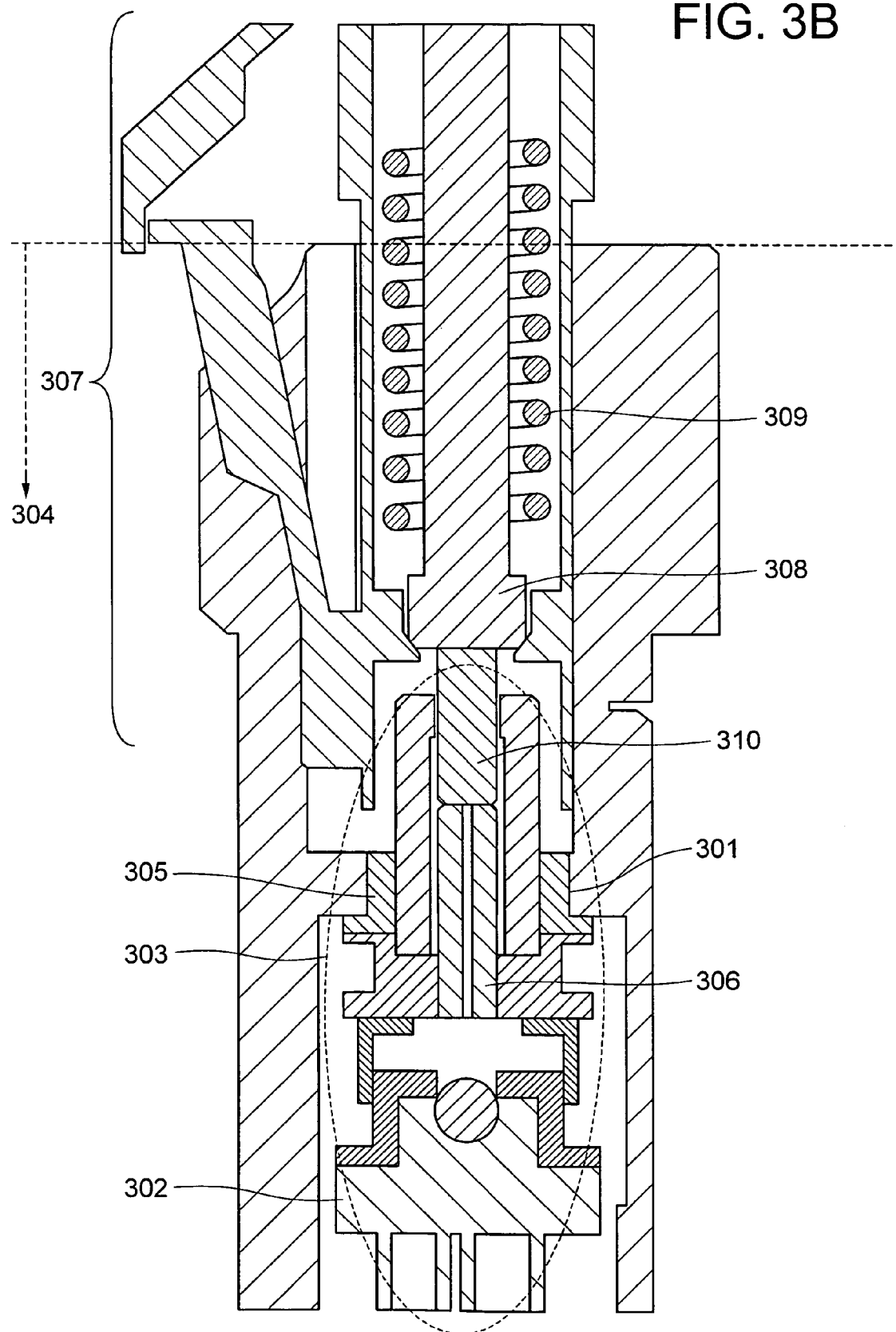
FIG. 3B is a diagram showing the third embodiment of the present invention.

FIGS. 3A and 3B are diagrams showing a third embodiment of the present invention. FIG. 3A shows an optical transceiver including a light-emitting device module or a light-receiving device module for an optical receptacle, which has been described in the above-described embodiment. FIG. 3B shows the structure of the optical receptacle block when the optical-fiber-side optical connector is connected to the optical transceiver in FIG. 3A. The light-emitting device module or the light-receiving device module 303 with a ceramic sleeve 301 having the features of the sleeve shown in the first embodiment is fixed to the optical transceiver 304 by using an insulation retaining material 305. Numeral 302 denotes a light-emitting device or a light-receiving device, and 306 denotes a stub ferrule.

As shown in FIG. 3B, when connecting an optical connector, the optical-fiber-side optical connector 307 is inserted into the optical receptacle portion of the optical transceiver, and the optical-connector ferrule 310 is pressed against the stub ferrule 306 of the light-emitting device module or light-receiving device module 303 is pressed against and connected to the stub ferrule 306 of the light-emitting device module or light-receiving device module by the spring force of a metal spring 309 in the optical connector. The optical connector 307 has a metal-made optical fiber holder 308 in it to hold the optical-connector ferrule 310 firmly in contact with the optical fiber. If the sleeve cover 401 (FIG. 4) corresponding to the sleeve 301 was used and it was made of metal, because of its being close in distance to the metal-made optical fiber holder 308 in the optical connector 307, unwanted high-frequency noise is electrically coupled to the optical fiber holder 308 and propagates on it, and is radiated through the metal spring 309 into a free space.

Moreover, unwanted electromagnetic noise and static electricity coming from outside may propagate through the metal spring 309 in the optical connector 307 to the metal-made optical fiber holder 308. In other words, if there was a sleeve cover 401 corresponding to the sleeve 301 and it was made of metal, the above-mentioned unwanted electromagnetic noise and static electricity may propagate inside the module. In such a case, this may give rise to malfunction not only in the light-emitting device module or light-receiving device module 303 but also in the internal circuit to which the module is connected.

In contrast to the above case, in the present invention, the sleeve 301 is made of a ceramic, a nonmetallic substance. There is a considerable space between the light-emitting module or light-receiving module 305 and the metal-made optical fiber holder 308 in the optical connector 307, so that it is possible to prevent propagation of unwanted electromagnetic noise and static electricity.

In the present invention, the connection portion between the optical connector 307 and the light-emitting device module or light-receiving device module 303 is structured such that the optical-connector ferrule 310 of the optical connector 307 is inserted about 4.0 mm into the sleeve 301. Therefore, when the sleeve 301 or a sleeve cover corresponding to the sleeve 301 is made of a resin or a soft material, if an external stress acts on the optical connector 307 in a direction different from the direction of its pressing against the stub ferrule 306, it becomes difficult to maintain the connected position of the optical-connector ferrule 310 and the stub ferrule 306.

In contrast, in the present invention, by using a nonmetallic hard material (ceramic Zirconia material) which is strong against external stress and less likely to be deformed, it becomes possible to prevent the connected position of the optical-connector ferrule 310 and the stub ferrule 306 as described above.

Additional description will be made with reference to FIGS. 1 and 2.

FIG. 1 shows an embodiment of the present invention. As shown in FIG. 1, the sleeve 101 is fixed to the stub ferrule 102 and the holder 103 by using an adhesive. The holder 103 is joined to the adapter 104 by YAG welding, and the adapter 104 is joined to the light-emitting module or the light-receiving module 105 by YAG welding. The sleeve 101 and the stub ferrule 102 are made of a ceramic, and the holder 103 and the adapter 104 are made of a metal.

FIG. 2 shows another embodiment of the present invention. As shown in FIG. 2, the sleeve 202 and the stub ferrule 203 are press-fit and fixed to the holder 204. The sleeve 202 is a slot sleeve. To protect the sleeve, a sleeve cover 201 is press-fit and fixed to the holder or fixed to the holder by using an adhesive. A unified sleeve is fixed to the stub ferrule 203 and the holder 204 by using an adhesive.

The holder 204 is joined to the adapter 205 by YAG welding, and the adapter 205 is further joined to the light-emitting module or light-receiving module 206 by YAG welding. The sleeve 202, the sleeve cover 201, and the stub ferrule 203 are made of ceramic. The holder 204 and the adapter 205 are made of metal.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical device module of an optical receptacle structure, comprising:
    a stub ferrule arranged to guide a laser light to an optical fiber to be connected thereto;
    a sleeve arranged to hold an optical-connector ferrule of said optical fiber to be connected to said stub ferrule;
    a sleeve cover to cover said sleeve,
    a holder fixing said stub ferrule and said sleeve,
    wherein said sleeve and said sleeve cover are formed by a ceramic material;
    wherein said sleeve is a slot sleeve, and said slot sleeve is mounted in a semi-fixed manner in relation to said holder, said sleeve cover and said stub ferrule;
    wherein said holder is provided with a groove for fixing said stub ferrule and said sleeve cover by press-fitting and for mounting said slot sleeve in a semi-fixed manner, and said holder is formed by a metallic material and has the same thermal expansion coefficient as that of said sleeve cover; and
    an adapter arranged to connect said holder to an optical module.

2. An optical receptacle arranged to be connected to an optical connector, comprising:
    a stub ferrule arranged to guide a laser light to an optical fiber to be connected thereto;
    a sleeve arranged to hold an optical-connector ferrule of said optical fiber to be connected to said stub ferrule;
    a sleeve cover to cover said sleeve;
    a holder fixing said stub ferrule and said sleeve;
    wherein said sleeve and said sleeve cover are formed by a monolithic ceramic material;
    wherein said sleeve is a slot sleeve, and said slot sleeve is mounted in a semi-fixed manner in relation to said holder, said sleeve cover and said stub ferrule;
    wherein said holder is provided with a groove for fixing said stub ferrule and said sleeve cover by press-fitting and for mounting said slot sleeve in a semi-fixed manner, and said holder is formed by a metallic material and has the same thermal expansion coefficient as that of said sleeve cover; and
    an adapter arranged to connect said holder to an optical module.

* * * * *